Feb. 4, 1958  S. R. RUDOLPH  2,822,004
MACHINE FOR CUTTING NON-RIGID MATERIAL INTO BLOCKS
Filed Nov. 9, 1956  7 Sheets-Sheet 1

INVENTOR.
SIMON R. RUDOLPH
BY Ely, Frye & Hamilton
ATTORNEYS

INVENTOR.
SIMON R. RUDOLPH

INVENTOR.
SIMON R. RUDOLPH

Feb. 4, 1958 S. R. RUDOLPH 2,822,004
MACHINE FOR CUTTING NON-RIGID MATERIAL INTO BLOCKS
Filed Nov. 9, 1956 7 Sheets-Sheet 5

INVENTOR.
SIMON R. RUDOLPH
BY Ely, Frye & Hamilton
ATTORNEYS

Feb. 4, 1958  S. R. RUDOLPH  2,822,004
MACHINE FOR CUTTING NON-RIGID MATERIAL INTO BLOCKS
Filed Nov. 9, 1956  7 Sheets-Sheet 6

INVENTOR.
SIMON R. RUDOLPH
BY Ely, Frye & Hamilton
ATTORNEYS

Feb. 4, 1958    S. R. RUDOLPH    2,822,004
MACHINE FOR CUTTING NON-RIGID MATERIAL INTO BLOCKS
Filed Nov. 9, 1956    7 Sheets-Sheet 7
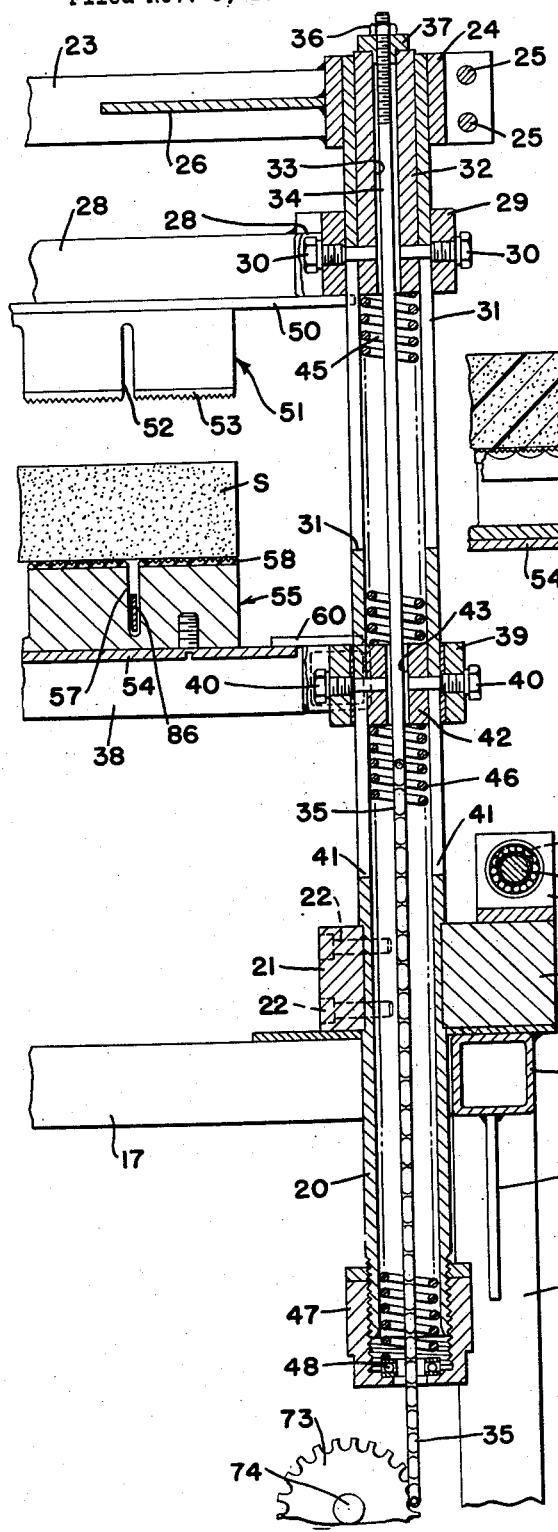
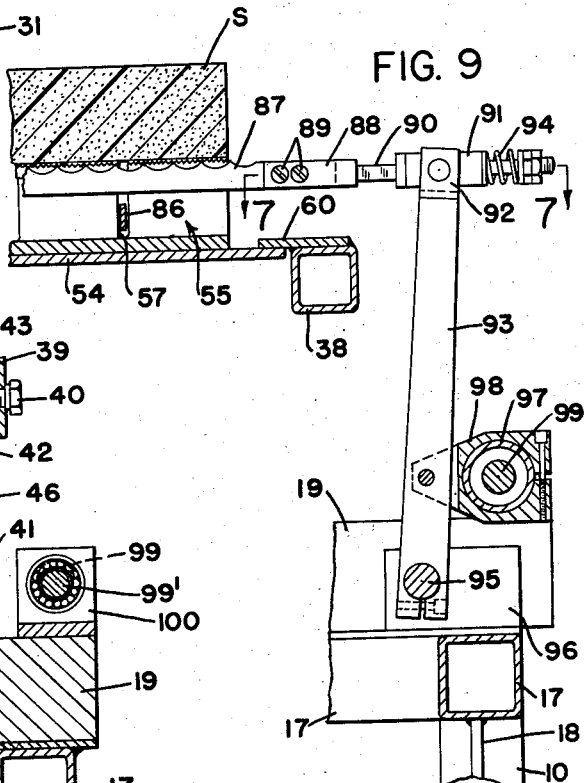
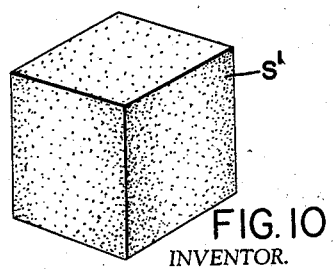
FIG. 10
INVENTOR.
SIMON R. RUDOLPH
BY *Elg. Fryer Hamilton*
ATTORNEYS United States Patent Office 2,822,004
Patented Feb. 4, 1958

2,822,004

MACHINE FOR CUTTING NON-RIGID MATERIAL INTO BLOCKS

Simon R. Rudolph, Akron, Ohio

Application November 9, 1956, Serial No. 621,267

16 Claims. (Cl. 143—60)

The invention relates generally to machines for dividing material simultaneously into a plurality of relatively small blocks, and more particularly to an improved machine for cutting a slab of flexible or resilient material simultaneously into a number of square-cut, rectangular blocks.

In dividing slabs of resilient or rubbery material into a plurality of small blocks, it has beben conventional practice to cut the slab into successive strips on band saws or circular slitters and then to cut the strips successively into blocks. Such an operation is slow, tedious and expensive and, moreover, the faces of the blocks are not accurately cut in true planes at right angles to each other, due to the difficulty of holding the slabs and strips in position as they are cut because the flexibility of the material allows it to distort as the cutting blade passes therethrough.

Certain prior machines have been provided for cutting blocks or slabs of rigid material into a number of small blocks, as, for example, ice cube making machines in which a block of ice is passed successively through two gangs of saws for making cuts at right angles to each other. Such machines are not adapted for cutting non-rigid or rubbery material because there is no way to prevent distortion of the material as the saws pass through it, and holding a slab of such material in position to obtain a plurality of square-cut blocks is even more difficult than holding pre-cut strips.

It is an object of the present invention to provide an improved machine for cutting slabs of non-rigid material simultaneously into a plurality of accurately square-cut rectangular blocks.

The improved machine employs upper and lower die blocks in co-operation with gangs of saws to hold a slab of non-rigid or rubbery material accurately in position between the dies during the cutting operation under a pre-determined amount of pressure, adjusted to hold the blocks in position throughout the cutting operation without causing or allowing any substantial distortion of the material.

Another and more specific object is to provide improved means for moving a slab of non-rigid material through a gang of cutting saws.

A further object is to provide improved means for holding the individual blocks in position throughout the entire cutting operation.

A still further object is to provide improved means for dumping the cut blocks from the machine.

These and other objects are accomplished by the improved construction comprising the present invention, a preferred embodiment of which is shown by way of example in the accompanying drawings and hereinafter described in detail. Various modifications and changes in details of construction are comprehended within the scope of the invention as defined in the appended claims.

Referring to the drawings:

Fig. 8 is an enlarged fragmentary vertical sectional view on line 8—8 of Fig. 1.

Fig. 9 is an enlarged fragmentary sectional view as on line 9—9 of Fig. 1.

Fig. 10 is an isometric view of one of the blocks of non-rigid material cut in the machine.

Figure 1:
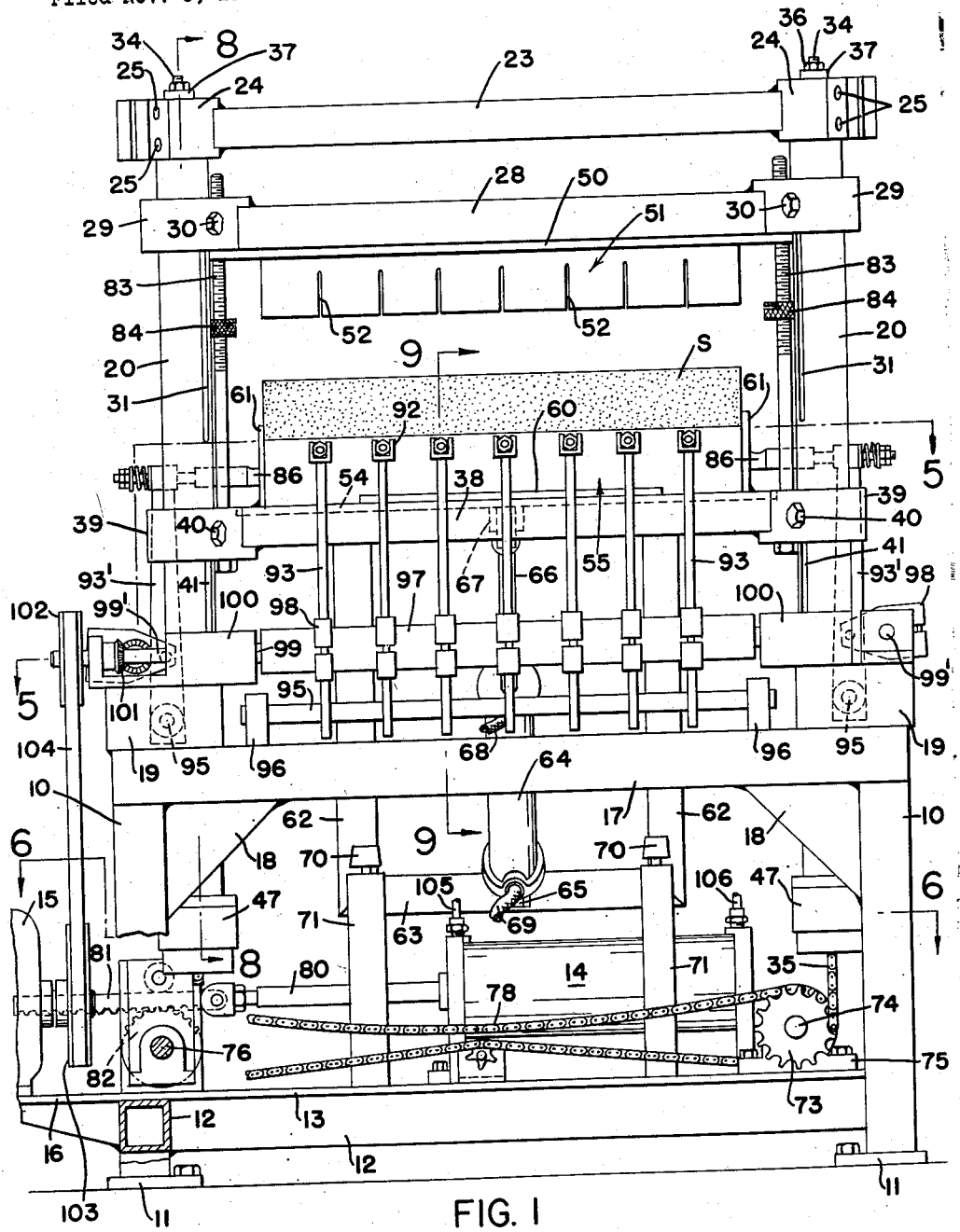
Fig. 1 is a side elevation of the improved machine with a slab of material positioned on the lower die block and the upper die block in fully raised position, prior to starting the cutting operation.
Figure 6:
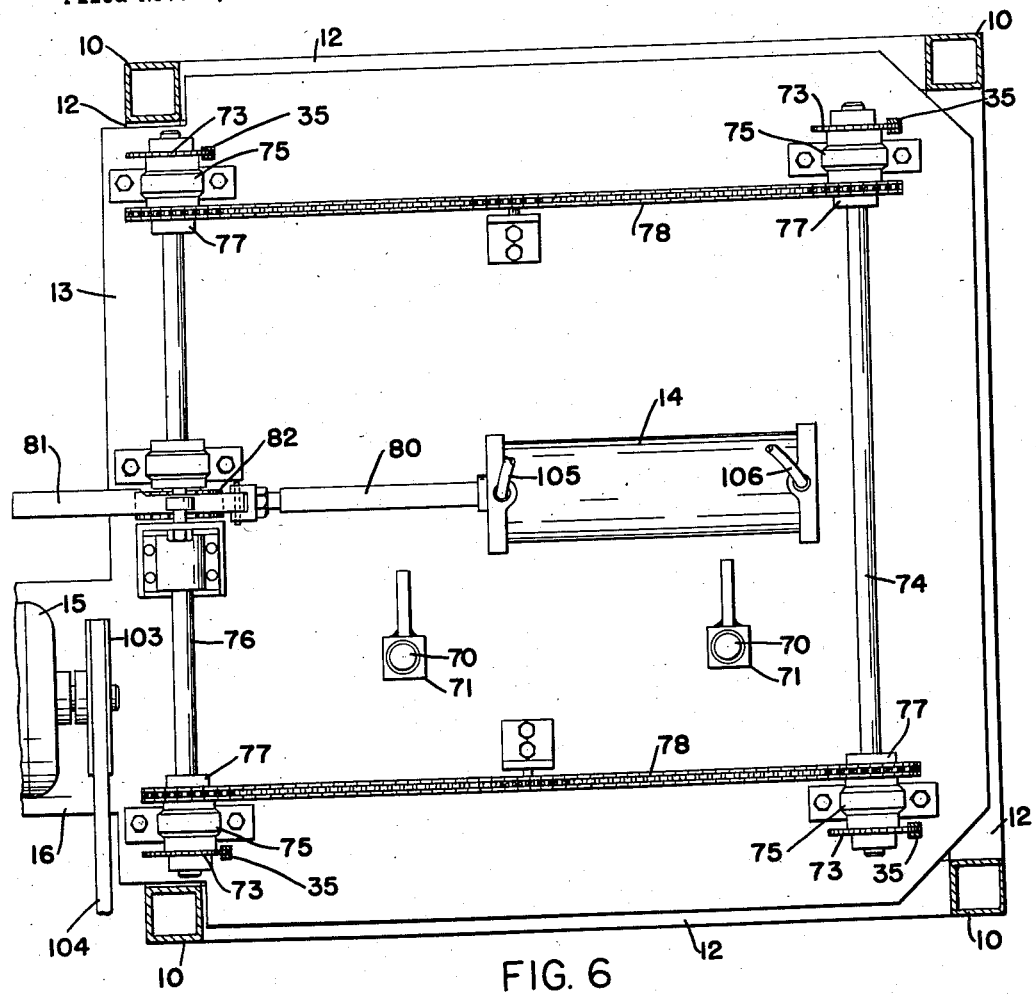
Fig. 6 is a plan sectional view as on line 6—6 of Fig. 1.

Referring to Figs. 1 and 6, the improved machine is substantially rectangular and, preferably, has four vertical corner posts 10 supported on the floor or other supporting surface by base flanges 11. The posts may have the form of a hollow square in cross section, as shown. Adjacent to the base flanges 11 are horizontal frame members 12 extending at right angles to each other and connected at their ends to the posts 10, as by welding. The members 12 may also have a hollow square cross section as shown.

A substantially rectangular base plate 13 is supported along its edges on the frame members 12, and a double-acting fluid cylinder 14 for lowering the die blocks to move the material through the saws is carried on the base plate 13, as is also the driving motor 15 for oscillating the gangs of saws. As shown, the motor 15 is supported on an extension 16 of the base plate, at what may be termed the rear side of the machine.

Figure 5:
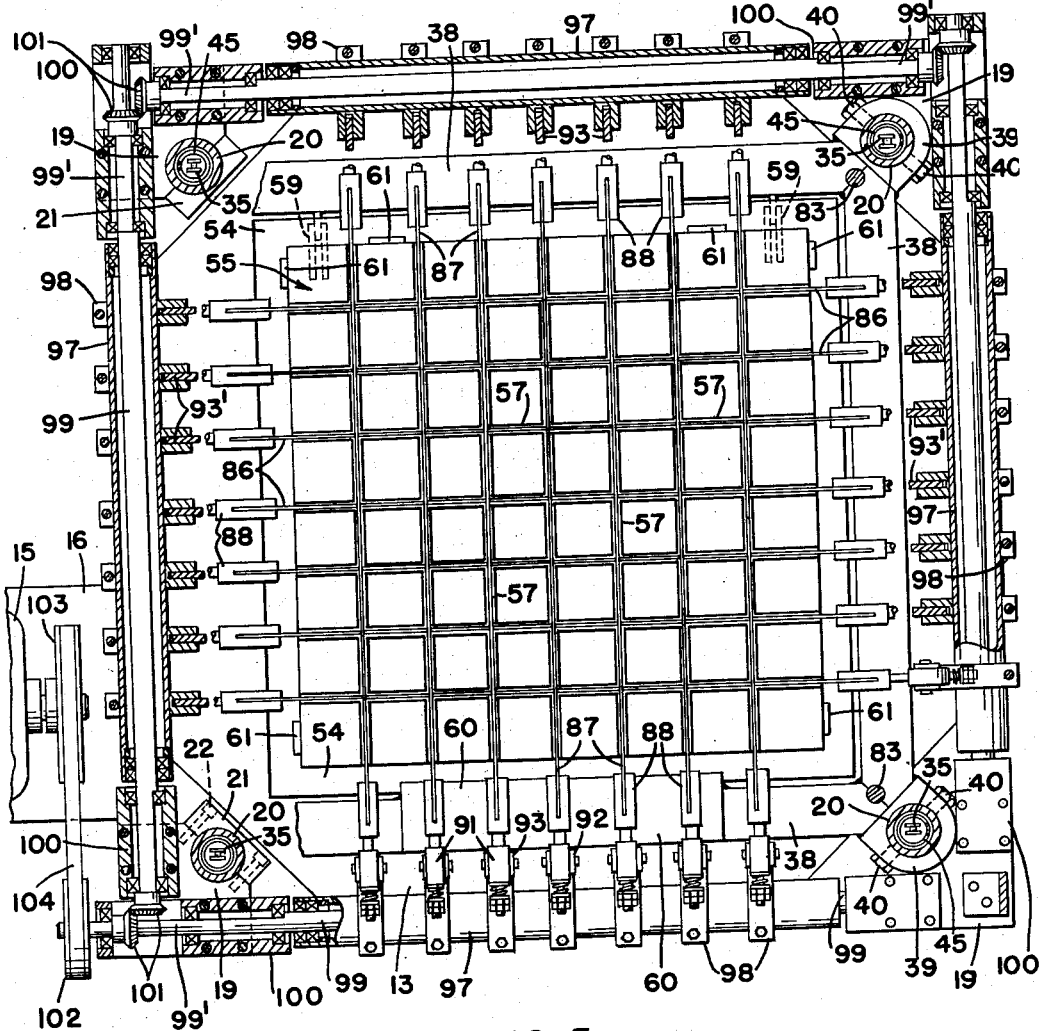
Fig. 5 is a plan sectional view as on line 5—5 of Fig. 1.

The four posts 10 are connected at their top ends by four horizontal frame members 17 at right angles to each other, and preferably similar in construction to the horizontal frame members 12. Gusset plates 18 are preferably provided between the posts 10 and frame members 17 to reinforce the frame. Supported on the corners of the frame members 17 are four mounting blocks 19 which carry the lower portions of four vertical tubes or cylindrical posts 20 on which the upper and lower die plates are movably mounted. As best shown in Figs. 5 and 8, the mounting blocks have removable inner sections 21 attached thereto by screws 22 and the posts 20 have reduced diameter portions clamped in the cylindrical bores formed between the blocks 19 and their removable sections 21.

The upper ends of the four posts 20 are rigidly connected together by a rectangular framework comprising four horizontal tubular members 23, which may be square in cross section, connected at their ends as by welding to split corner brackets 24 clamped to the top ends of the posts by bolts 25. Gusset plates 26 (Fig. 8) are preferably provided in the corners of the framework to reinforce the same.

The upper die holder comprises a rectangular frame consisting of four horizontal tubular members 28, which may be square in cross section, arranged at right angles to each other and connected at their ends as by welding to corner guide rings 29 slidable on the posts 20. As seen in Fig. 8, the guides 29 have diametrically opposite screw studs 30 therein, and the shanks of the screw studs extend into the hollow posts and are slidably received in slots 31 in the posts. Within the posts the shanks of the studs 30 extend into holes provided in plugs 32 which are slidable axially in said posts.

The plugs 32 have axial bores 33 extending therethrough, and chain anchoring rods 34 extend through the bores for connection at their lower ends with driving chains 35 which pull down on the plugs 32 and on the upper die holder through the studs 30. The upper ends of the rods 34 are threaded and have adjusting nuts 36 screwed thereon. Bushings 37 are interposed between the nuts 36 and the upper ends of the plugs 32.

The lower die holder also comprises a rectangular frame made up of four horizontal tubular members 38, which may be square in cross section, arranged at right angles to each other and connected at their ends as by welding to corner guide rings 39 slidable on the posts 20. The guides 39 have diametrically opposite screw studs 40 therein, with their shanks extending through slots 41 in the posts and into plugs 42 slidable axially in said posts. The plugs 42 have axial bores 43 through which the chain anchoring rods 34 extend.

Referring to Fig. 8, helical compression springs 45 are positioned within the posts 20 between the upper plugs 32 and the lower plugs 42, and urge the upper and lower die holders apart to the open position shown. Helical compression springs 46 are positioned in the posts 20 below the lower plugs for urging the lower die holders upwardly and the springs 46 are substantially longer and stronger than the springs 45 for a purpose to be described. Abutment nuts 47 are screwed on the bottom ends of said posts for adjusting the compression of the springs. Thrust bearings 48 may be provided in said nuts 47 for abutting the ends of springs 46.

The upper die holder has a rectangular die plate 50 secured at its edges to the undersides of the tubular die frame members 28, and depending from the plate 50 is a rectangular die block 51 which is provided with downwardly open slots 52 at right angles to each other to form squares or rectangles in the slab S of non-rigid material to be cut. Obviously, these slots can be arranged to cut squares or rectangles of any desired size and shape, and a plurality of replacement die holders can be provided for changing the size or shape of blocks being cut. As shown in Fig. 8, the lower surface of the die block 51 is preferably provided with serrated plates 53 for gripping the upper surface of the slab S when brought into contact therewith.

The lower die holder carries a rectangular die plate 54 which has a rectangular die block 55 extending upwardly therefrom, provided with upwardly open slots 57 at right angles to each other and matching the slots 52 in the upper die block. The upper surface of the die block 55 is preferably provided with serrated plates 58 for gripping the lower surface of the slab S when placed on the die block.

Figure 3:
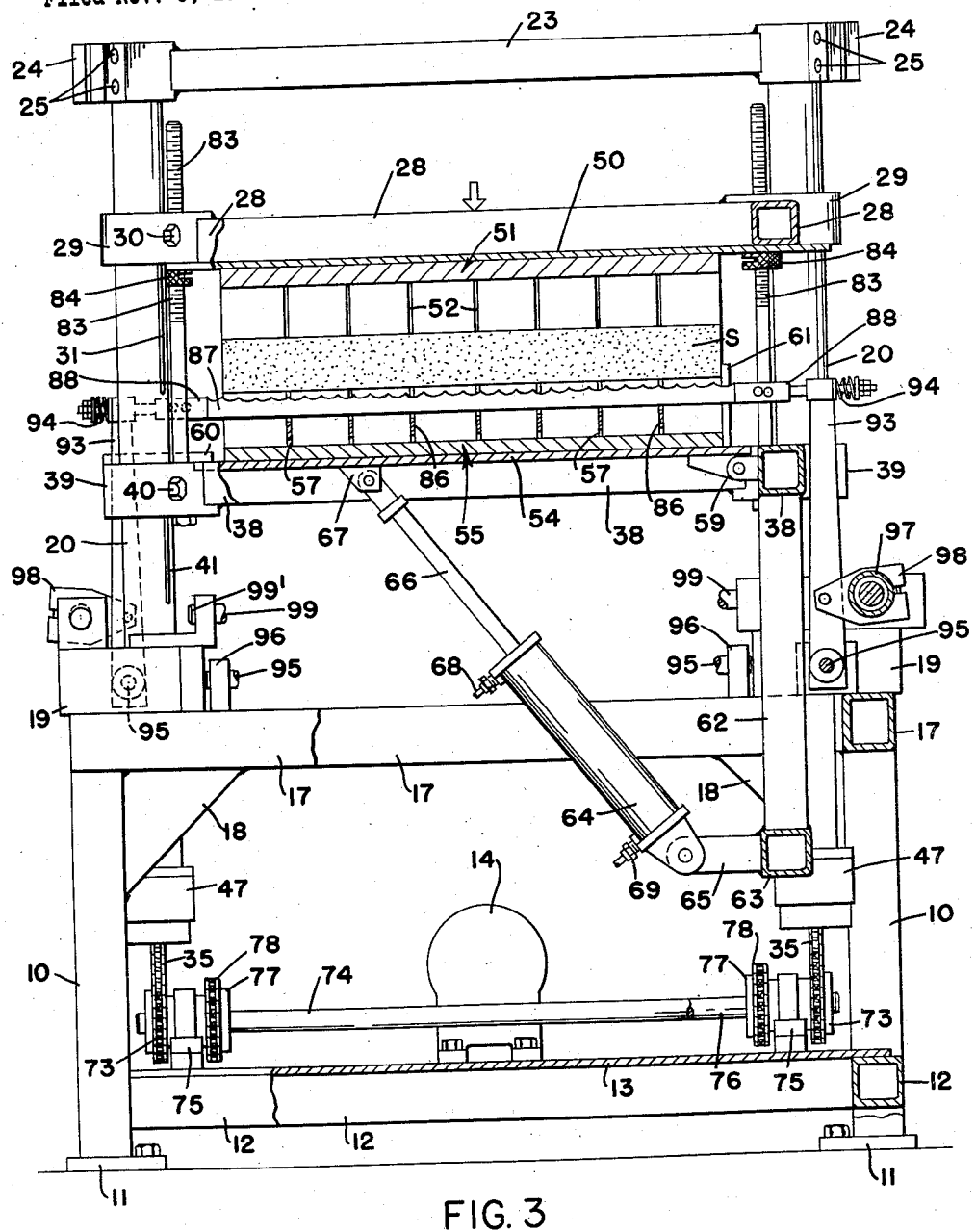
Fig. 3 is a front elevation, partly in section, showing the upper die block lowered into contact with the slab of material.
Figure 4:
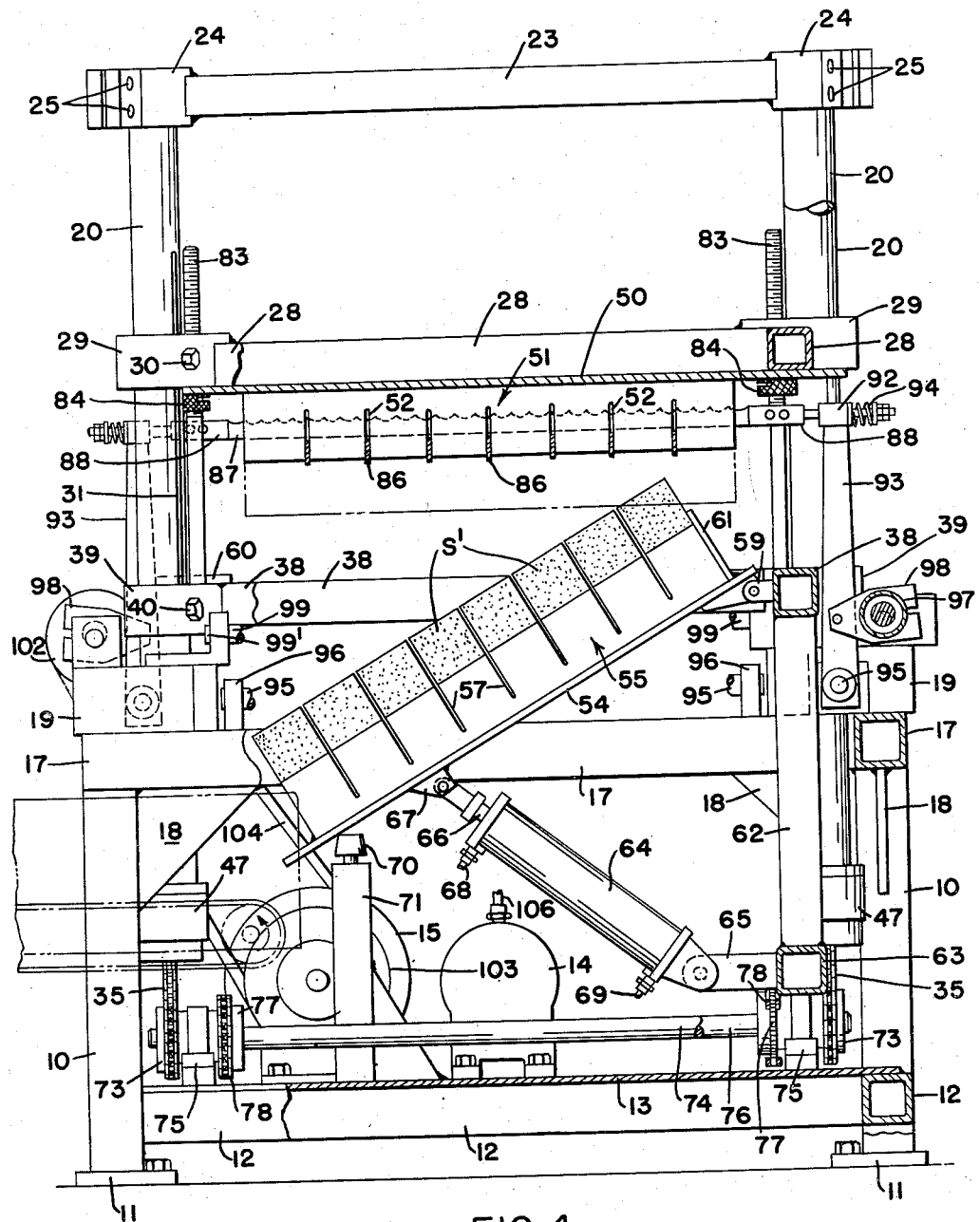
Fig. 4 is a front elevation, partly in section, showing the lower die block and its holder tilted to dump the cut blocks after the material has passed through the saws.

As shown in Figs. 3 and 4, the die plate 54 is preferably hinged along one side to the lower side holder, so that when the slab S has been cut into blocks, the blocks can be easily dumped by swinging the die plate downwardly on its hinges. The hinges are shown at 59 on one side of the die plate, and on the opposite side of the frame is an overhanging stop plate 60 against which the die plate abuts when it is returned to horizontal position. Suitable latch means may be provided for detachably holding the die plate in horizontal posiiton, if desired. Guide bars 61 may be provided around three sides of the lower die plate 54, and extend upwardly beyond the top surface of the die block, to facilitate centering the slab S thereon.

The hinge side of the lower die holder has depending vertical legs 62 connected at their lower ends by a horizontal bar 63, and a fluid cylinder 64 for dumping the bottom die plate is pivoted at one end on a bracket arm 65 on said bar 63. The piston rod 66 is pivoted to a bracket ear 67 on the die plate 54. The cylinder is provided with suitable pressure fluid connections 68 and 69 which are connected to a suitable control valve (not shown). Bumpers 70 for abutting the lower die plate 54 in dumping position may be mounted on posts 71 supported on base plate 13.

The pull-down chains 35 in the four posts 20 extend downwardly through the nuts 47 and have their bottom ends fastened to sprockets 73. As seen in Fig. 6, two sprockets 73 are mounted on the ends of a cross shaft 74 mounted in bearings 75 at the front of the base plate 13 and the other two sprockets 73 are mounted on the ends of a parallel shaft 76 mounted in bearings 75 at the rear of the base plate. Sprockets 77 are mounted on the shafts 74 and 76 adjacent to the bearings 75, and on the opposite sides thereof from the sprockets 73. Endless chains 78 connect the sprockets 77 on shaft 74 with the sprockets 77 on shaft 76.

The piston rod 80 of fluid cylinder 14 has a rack bar 81 on its outer end (Figs. 1 and 6) meshing with a pinion 82 secured on the shaft 76, so that inward movement of the piston rod 80 will rotate the shafts clockwise, as viewed in Fig. 1, and pull down on the chains 35 to lower the die holders. As the chains 35 pull down on the anchor rods 34 the springs 45 will first be compressed to allow the upper die block to move downwardly toward the lower die block.

Referring to Figs. 1 and 3, vertical guide rods 83 are secured in the corners of the lower die holder frame and extend upwardly through holes in the corners of the upper die holder frame. These rods 83 are threaded throughout their upper portions, and adjustable stop nuts 84 are screwed thereon between the upper and lower die holder frames. Accordingly, as the upper die block descends toward the lower die block, the upper die plate abuts the nuts 84, and carries the lower die block downwardly, compressing the springs 46. As shown in Fig. 3, the nuts 84 are adjusted so that they are abutted by the upper die plate, just as the upper die block makes firm holding contact with the material slab S. Thus, the required slight pressure for holding the slab firmly as it is cut into blocks can be varied as desired.

Figure 2:
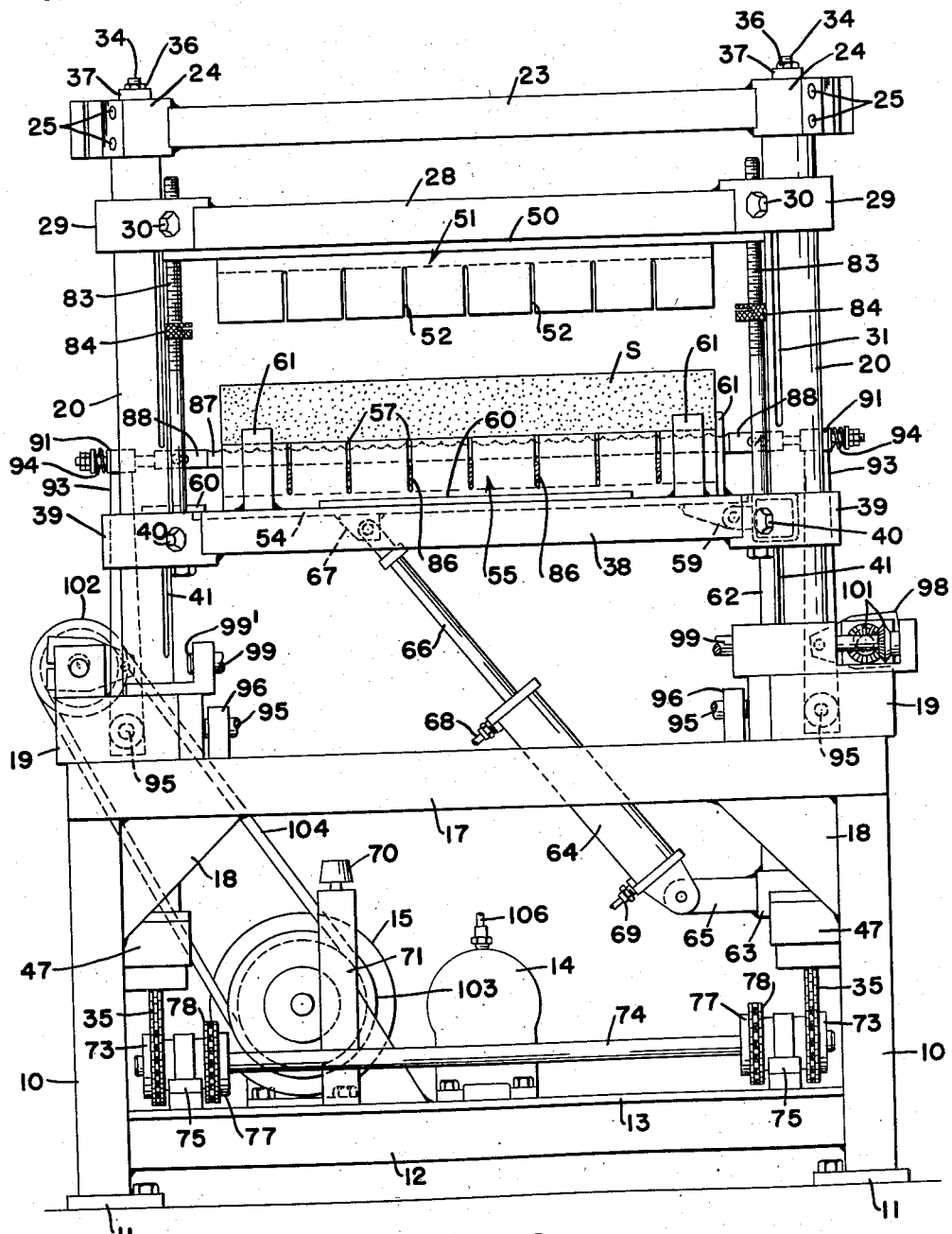
Fig. 2 is a front elevation thereof.

As shown in Fig. 5, two gangs of saw blades are positioned at right angles to each other for extending through the slots 52 and 57 of the upper and lower die blocks. One gang of parallel saw blades 86 extends from front to rear of the machine, and the other gang of saws 87 extends from side to side at right angles to and spaced slightly above the saws 86 (Fig. 2).

Figure 7:
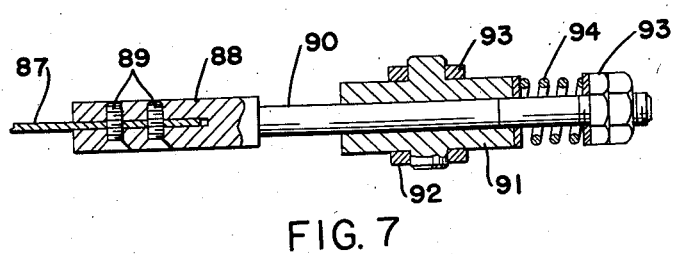
Fig. 7 is an enlarged fragmentary sectional view on line 7—7 of Fig. 9, showing the manner of mounting one of the saws in the actuating means therefor.

Referring to Figs. 7 and 9, each of the saw blades 87 is held at opposite ends in a clamp bar 88 by screws 89, and the clamp bar has a squared portion 90 axially slidable in a bushing 91 pivoted in a yoke 92 at the top of a rocker arm 93. Between the bushings 91 and a stop nut on the outer end of the bar is a spring 94 for yieldingly tensioning the blade. The saw blades 86 are similarly mounted and carried at the tops of rocker arms 93' (Fig. 1) which are slightly shorter than rocker arms 93, due to the lower positions of saw blades 86 below saw blades 87.

The saw blades 86 and 87 are shown positioned horizontally, but may be slightly inclined to give a shearing action if desired. Preferably, the cutting edges of both gangs of blades are scalloped as shown, but the shape of the cutting edge may be varied as desired.

Each of the rocker arms 93 and 93' is clamped at its lower end on a rocker shaft 95 journaled at its ends in bearings 96 supported on the respective frame members 17 at the corresponding side of the machine. Extending along all four sides of the machine above and slightly outwardly of the shafts 95 are four tubular shafts 97 to which intermediate portions of the rocker arms 93 and 93' are pivoted by split clamps 98. The rocker arms are oscillated by imparting an eccentric movement to the shafts 97.

The tubular shafts 97 have shafts 99 extending therethrough and journaled in bearings in the ends of shafts 97. The shafts 99 have projecting offset or eccentric end portions 99' (Figs. 1 and 8) which are journaled in bearings boxes 100 supported on the mounting blocks 19 at the corners of the frame members 17, and meshing bevel gears 101 rotatably connect the shafts 99' at the adjacent ends of the bearings boxes. One of the shafts has a pulley 102 connected to the drive pulley 103 by a belt 104, so that the motor 15 rotates all the shafts 99 simultaneously and imparts an eccentric movement to the tubular shafts 97.

In the operation of the improved machine, assuming the die blocks to be in the raised or open position of Fig. 1, a slab S of non-rigid material is positioned on the lower die block 55 within the guide bars 61 as shown. The slab S may be lightweight spongy material such as polyurethane which is very unstable and difficult to cut into block because it is so easily distorted. The ends of cylinder 14 are connected by fluid connections 105 and 106 to a suitable reversing control valve (not shown).

When the slab S has been positioned on the lower die block, the operator actuates the reversing control valve to move the piston rod 80 of cylinder 14 to the left, as viewed in Fig. 1, rotating the shafts 76 and 74 clockwise and pulling down on chains 35. Preferably the cylinder is connected to a bleed valve or other well-known speed control to regulate the travel of the piston in both directions. As the chains 35 pull the upper die holder downwardly, compressing the upper springs 45, the upper die block firmly engages the upper surface of the slab S, at which time the upper die plate abuts the stop nuts 84, the nuts having been adjusted according to the thickness and resiliency of the slab to give the desired results.

Continued downward movement of the chains 35 moves upper and lower die holders downwardly in unison, moving the slab first through the upper gang of saw blades 87 and then through the lower gang 86, while the slab is firmly held at the required constant pressure between the die blocks 51 and 55. After the slab has passed through both gangs of saws, it is cut into a plurality of blocks S' as shown in Fig. 4. An important feature of the machine is that as the blocks S' are being cut in one direction by the saws 87 and then in the other direction by the saws 86, they are at all times firmly held between the die blocks by a predetermined amount of pressure, which produces accurately square-cut blocks having their cut faces exactly at right angles to each other.

When the slab S has passed through both gangs of saws, the screw studs 40 in the lower die holder abut the bottom ends of the slots 41 in posts 20 (Fig. 8), stopping further downward movement of the die blocks. At this time, the cylinder 64 is operated to swing the bottom die plate 54 downwardly as shown in Fig. 4 and dump the blocks S', after which the flow to the cylinder 64 is reversed and the lower die plate returned to horizontal position. The flow through cylinder 14 is then reversed and the springs 46 and 45 raise the die blocks to the starting position of Fig. 1, at a rate regulated by the flow of fluid through the cylinder 14.

Obviously, the controls for cylinders 14 and 64 can be operated manually, or the operation of cylinder 64 can be automatically controlled by suitable valves actuated by the downward travel of the lower die holder. Similarly, the return movement of the die holders can be automatically controlled by the operation of cylinder 64, so as to be initiated when the lower die plate is returned to horizontal position.

If it is desired to cut larger square blocks or rectangles larger in at least one dimension, certain of the saw blades 86 or 87 can be omitted. Moreover, the spacing of the saw blades can be adjusted to accommodate die blocks having different sizes and shapes, by adjusting the rocker arms 93 and 93' along the shafts 95 and 97.

What is claimed is:

1. A machine for cutting non-rigid material into a plurality of blocks comprising vertically spaced horizontal die blocks having at least two series of matching parallel slots intersecting each other, means mounting said die blocks for movement vertically in horizontal position, means for moving the die blocks vertically relative to each other to hold a slab of said material between them under predetermined pressure, at least two gangs of saw blades extending one above the other between said die blocks in alignment one gang with each series of slots, and means for moving said die blocks vertically in unison to pass a slab of material held between them successively through said gangs of saw blades.

2. A machine for cutting non-rigid material into a plurality of blocks comprising vertically spaced horizontal die blocks having at least two series of matching parallel slots intersecting each other, means mounting said die blocks for movement vertically in horizontal position, means for moving one of the die blocks toward the other, stop means on the other die block to limit the amount of pressure applied to a slab of said material between said die blocks and to cause continued movement of said die blocks in unison, at least two gangs of saw blades extending one above the other between the die blocks in alignment one gang with each series of slots for passing successively through said moving slab, and means for reciprocating said saw blades.

3. A machine for cutting non-rigid material into a plurality of blocks comprising vertically spaced horizontal die blocks having at least two series of matching parallel slots intersecting each other, means mounting said die blocks for movement vertically in horizontal position, means for moving one of the die blocks toward the other, stop means on the other die block to limit the amount of pressure applied to a slab of said material between said die blocks and to cause continued movement of said die blocks in unison, at least two gangs of saw blades one above the other and normally extending through the respective series of slots in said other die block, whereby the continued movement of said die blocks in unison will pass the gangs of saw blades successively through said slab of material.

4. A machine for cutting non-rigid material into a plurality of blocks comprising vertically spaced horizontal die blocks having at least two series of matching parallel slots intersecting each other, means mounting said die blocks for movement vertically in horizontal position, means for moving the die blocks vertically relative to each other to hold a slab of said material between them under predetermined pressure, at least two gangs of saw blades extending one above the other between said die blocks in alignment one gang with each series of slots, means for moving said die blocks vertically in unison to pass a slab of material held between them successively through said gangs of saw blocks, and means for tilting the lower die block to dump the cut blocks of material.

5. A machine for cutting non-rigid material into a plurality of blocks comprising vertically spaced horizontal die blocks having at least two series of matching parallel slots intersecting each other, means mounting said die blocks for movement vertically in horizontal position, means for moving one of the die blocks toward the other, stop means on the other die block to limit the amount of pressure applied to a slab of said material between said die blocks and to cause continued movement of said die blocks in unison, at least two gangs of saw blades extending one above the other between the die blocks in alignment one gang with each series of slots for passing successively through said moving slab, means for reciprocating said saw blades, and means for tilting the lower die block to dump the cut blocks of material.

6. A machine for cutting non-rigid material into a plurality of blocks comprising vertically spaced horizontal die blocks having at least two series of matching parallel slots intersecting each other, means mounting said die blocks for movement vertically in horizontal position, means for moving one of the die blocks toward the other, stop means on the other die block to limit the amount of pressure applied to a slab of said material between said die blocks and to cause continued movement of said die blocks in unison, at least two gangs of saw blades one above the other and normally extending through the respective series of slots in said other die block, whereby the continued movement of said die blocks in unison will pass the gangs of saw blades successively through said slab of material, and means for tilting the lower die block to dump the cut blocks of material.

7. A machine for cutting non-rigid material into a plurality of blocks comprising horizontal die blocks having matching slots intersecting each other at right angles, means mounting said die blocks for movement vertically in horizontal position, means for moving the die blocks relative to each other to hold a slab of said material under predetermined pressure between the die blocks, two gangs of saw blades one above the other extending at right angles to each other between said die blocks in alignment with the slots therein, and means for moving said die blocks vertically in unison to pass a slab of material held between them through said saw blades.

8. A machine for cutting non-rigid material into a plurality of blocks comprising horizontal die blocks having matching slots intersecting each other at right angles, means mounting said die blocks for movement vertically in horizontal position, means for moving the die blocks relative to each other to hold a slab of said material under predetermined pressure between the die blocks, two gangs of saw blades one above the other extending at right angles to each other between said die blocks in alignment with the slots therein, means for reciprocating said saw blades, means for moving said die blocks vertically in unison to pass a slab of material held between the die blocks through said saw blades, and means for tilting the lower die block to dump the cut blocks of material.

9. A machine for cutting non-rigid material into a plurality of blocks, comprising vertical corner posts, vertically spaced horizontal die blocks movably mounted on said posts and having parallel series of intersecting vertical slots, the slots in one die block matching the slots in the other die block, means for moving the die blocks relative to each other to hold a slab of material under predetermined pressure between the die blocks, gangs of parallel saw blades one above the other extending between the die blocks in vertical alignment with the respective series of slots, and means for moving said die blocks in unison on said posts to pass a slab of said material held between said die blocks through said saw blades.

10. A machine for cutting non-rigid material into a plurality of blocks, comprising vertical corner posts, vertically spaced horizontal die blocks movably mounted on said posts and having parallel series of intersecting vertical slots, the slots in one die block matching the slots in the other die block, means for moving the die blocks relative to each other to hold a slab of material under predetermined pressure between the die blocks, gangs of parallel saw blades one above the other extending between the die blocks in vertical alignment with the respective series of slots, means for moving said die blocks in unison on said posts to pass a slab of said material held between said die blocks through said saw blades, and spring means in said posts for yieldingly resisting said movement of the die blocks.

11. A machine for cutting non-rigid material into a plurality of blocks, comprising vertical corner posts, vertically spaced under and lower horizontal die blocks movably mounted on said posts, said die blocks having series of parallel intersecting vertical slots, the slots in one die block matching the slots in the other die block, gangs of parallel saws one above the other extending between said die blocks in vertical alignment with the respective series of slots, means for moving said upper die block downwardly on said posts, and adjustable stop means on the lower die block to limit the amount of pressure applied to a slab of said material between said die blocks, said stop means acting to move said die blocks in unison for passing said slab of material successively through said gangs of saw blades.

12. A machine for cutting non-rigid material into a plurality of blocks, comprising vertical corner posts, vertically spaced upper and lower horizontal die blocks movably mounted on said posts, said die blocks having series of parallel intersecting vertical slots, the slots in one die block matching the slots in the other die block, gangs of parallel saws one above the other extending between said die blocks in vertical alignment with the respective series of slots, means for moving said upper die block downwardly on said posts, adjustable stop means on the lower die block to limit the amount of pressure applied to a slab of said material between said die blocks, said stop means acting to move said die blocks in unison for passing said slab of material successively through said gangs of saw blades, and spring means in said posts for yieldingly resisting downward movement of said die blocks.

13. A machine for cutting non-rigid material into a plurality of blocks, comprising vertical corner posts, vertically spaced upper and lower horizontal die blocks movably mounted on said posts, said die blocks having series of parallel intersecting vertical slots, the slots in one die block matching the slots in the other die block, gangs of parallel saws one above the other extending between said die blocks in vertical alignment with the respective series of slots, means for moving said upper die block downwardly on said posts, adjustable stop means on the lower die block to limit the amount of pressure applied to a slab of said material between said die blocks, said stop means acting to move said die blocks in unison for passing said slab of material successively through said gangs of saw blades, spring means in said posts acting between said die blocks to yieldingly resist downward movement of said upper die block, and spring means in said posts yieldingly resisting downward movement of said lower die block.

14. A machine for cutting non-rigid material into a plurality of blocks, comprising vertical corner posts, vertically spaced upper and lower horizontal die blocks movably mounted on said posts, said die blocks having series of parallel intersecting vertical slots, the slots in one die block matching the slots in the other die block, gangs of parallel saws one above the other extending between said die blocks in vertical alignment with the respective series of slots, means for moving said upper die block downwardly on said posts, adjustable stop means on the lower die block to limit the amount of pressure applied to a slab of said material between said die blocks, said stop means acting to move said die blocks in unison for passing said slab of material successively through said gangs of saw blades, and means for tilting the lower die block to dump the cut blocks of material.

15. A machine for cutting non-rigid material into a plurality of blocks, comprising vertical corner posts, vertically spaced upper and lower horizontal die blocks having series of parallel intersecting vertical slots, the slots in one die block matching the slots in the other die block, gangs of parallel saws one above the other extending between said die blocks in vertical alignment with the respective series of slots, linear means extending axially within said posts for moving said upper die block downwardly on said posts, means operatively connecting said linear means to said upper die block, adjustable stop means on the lower die block to limit the amount of pressure applied to a slab of said material between said die blocks, said stop means acting to move said die blocks in unison for passing said slab of material successively through said gangs of saws, and spring means in said posts yieldingly resisting downward movement of said die blocks.

16. A machine for cutting non-rigid material into a plurality of blocks, comprising vertical corner posts, vertically spaced upper and lower horizontal die blocks having series of parallel intersecting vertical slots, the slots in one die block matching the slots in the other die block, gangs of parallel saws one above the other extending between said die blocks in vertical alignment with the respective series of slots, linear means extending axially within said posts for moving said upper die block downwardly on said posts, means operatively connecting said linear means to said upper die block, adjustable stop means on the lower die block to limit the amount of pressure applied to a slab of said material between said die blocks, said stop means acting to move said die blocks in unison for passing said slab of material successively through said gangs of saws, spring means in said posts acting between said die blocks to resist downward movement of said upper die block relative to said lower die block, and spring means in said posts yieldingly resisting downward movement of said lower die block.

References Cited in the file of this patent
UNITED STATES PATENTS

| | | |
|---|---|---|
| 57,111 | Forschner | Aug. 14, 1866 |
| 1,649,991 | Spang | Nov. 22, 1927 |
| 2,024,517 | Fowler | Dec. 17, 1935 |
| 2,165,573 | Pfeil | July 11, 1939 |
| 2,171,264 | Campbell | Aug. 29, 1939 |

FOREIGN PATENTS

| | | |
|---|---|---|
| 326,359 | Germany | Sept. 25, 1920 |